United States Patent [19]

Noe et al.

[11] Patent Number: 5,619,733
[45] Date of Patent: Apr. 8, 1997

[54] METHOD AND APPARATUS FOR SYNCHRONIZING STREAMING AND NON-STREAMING MULTIMEDIA DEVICES BY CONTROLLING THE PLAY SPEED OF THE NON-STREAMING DEVICE IN RESPONSE TO A SYNCHRONIZATION SIGNAL

[75] Inventors: Bradley D. Noe; William W. Lawton; Michael J. Koval, all of Boca Raton; David W. Killian, Delray Beach, all of Fla.

[73] Assignee: International Business Machines Corporation, Armonk, N.Y.

[21] Appl. No.: 337,064

[22] Filed: Nov. 10, 1994

[51] Int. Cl.$^6$ .................................................. G06F 13/00
[52] U.S. Cl. ........................... 395/881; 395/551; 370/503
[58] Field of Search ..................................... 395/550, 650, 395/154, 881; 370/100.1, 84; 360/73.02

[56] References Cited

U.S. PATENT DOCUMENTS

| | | | |
|---|---|---|---|
| Re. 35,104 | 11/1995 | Murakami et al. | 370/84 |
| 4,893,256 | 1/1990 | Rutherfoord et al. | 395/154 |
| 4,907,105 | 3/1990 | Kurzweil, Jr. | 360/73.02 |
| 4,968,254 | 11/1990 | Gangwere, Jr. et al. | 434/118 |
| 5,062,124 | 10/1991 | Hayashi et al. | 375/107 |
| 5,065,345 | 11/1991 | Knowles et al. | 395/154 |
| 5,195,092 | 3/1993 | Wilson et al. | 370/94.2 |
| 5,208,665 | 4/1993 | McCalley et al. | 348/12 |
| 5,218,432 | 6/1993 | Wakeland | 348/590 |
| 5,230,041 | 7/1993 | Dinwiddie, Jr. et al. | 395/154 |
| 5,241,533 | 8/1993 | Amada et al. | 370/100.1 |
| 5,245,322 | 9/1993 | Dinwiddie, Jr. et al. | 395/154 |
| 5,265,248 | 11/1993 | Moulios et al. | 395/650 |
| 5,286,908 | 2/1994 | Jungleib | 84/603 |
| 5,333,299 | 7/1994 | Koval et al. | 395/550 |
| 5,339,413 | 8/1994 | Koval et al. | 395/650 |
| 5,471,576 | 11/1995 | Yee | 395/154 |

OTHER PUBLICATIONS

Little, Thomas D.C., Multimedia Synchronization Protocols for Broadband Integrated Services, IEEE, pp. 1368–1382 Dec. 1991.

Little, Thomas D.C., Spatio–Temporal Composition of Distributed Multimedia Objects for Value–Added Networks, IEEE, pp. 42–49 1991.

*Primary Examiner*—Thomas C. Lee
*Assistant Examiner*—Duo Chen
*Attorney, Agent, or Firm*—Jeffrey S. LaBaw; Andrew J. Dillon

[57] ABSTRACT

Disclosed are apparatus and methods for synchronized presentation of analog and digital data by applying a common synchronization scheme to both types of data. Digital data is "streamed" by transferring the data in blocks from a source to a series of memory buffers, where it accumulates for subsequent transfer to an output device driver. The control module responsible for data streaming periodically reports a temporal location within the presentation represented by the data. A supervisory module designates one of the control modules a "master", and periodically compares the values reported by the various other control modules against that reported by the master. If a comparison exceeds a threshold tolerance value associated with each control module, a sync pulse is delivered to that control module, causing it to correct the synchronization mismatch. This approach is applied to analog sources through the use of control modules that behave in a manner consistent with the digital control modules, but which are capable of directing the operation of analog devices and re-establishing their synchronization with other data sources despite limited modes of device control. Specifically, the control modules that handle analog information also periodically report a presentation location based solely on temporal information, react to sync pulses by altering the playback rate of the analog devices they control within user-tolerable limits, and can act as master control modules.

11 Claims, 3 Drawing Sheets

METHOD AND APPARATUS FOR SYNCHRONIZING STREAMING AND NON-STREAMING MULTIMEDIA DEVICES BY CONTROLLING THE PLAY SPEED OF THE NON-STREAMING DEVICE IN RESPONSE TO A SYNCHRONIZATION SIGNAL

FIELD OF THE INVENTION

This invention relates to methods and apparatus for operating a multimedia computer platform, and in particular to facilitating synchronized presentation of dissimilar types of multimedia output (including digital and analog output).

BACKGROUND OF THE INVENTION

Multimedia systems integrate multiple sources of electronically encoded audio and video for simultaneous, synchronized presentation over an integrated set of output devices. For example, audio information might be stored on magnetic tape or a compact disc (CD), or obtained directly from a microphone coupled to a digital sampler; video information can originate with a videodisc, CD (possibly, although not necessarily, the same CD containing audio information), a laser disc, or an active digital video camera. A multimedia presentation can also include graphical components, text, and still images, all represented digitally and introduced into the presentation at appropriate times; moreover, in so-called "virtual reality" environments, a presentation can include "haptic" or tactile information obtained from and imparted to the user through suitable transducer arrangements (such as the well-known data glove).

More generally, the presentation is conveyed to a viewer over output devices capable of converting the various digital representations into their native form. Multimedia output systems can range, for example, from no more than a computer-driven video monitor and associated sound hardware to integrated high-end stereo and digital video projection systems and full-body haptic transducer arrays.

Managing the equipment that permits multimedia presentations to be created from their individual audiovisual components, stored, and later retrieved for playback requires substantial processing power. The multimedia information itself can involve prodigious amounts of electronic data even for relatively short presentation sequences, all of which must be handled in a manner that preserves temporal interrelationships. Ordinarily, computational responsibility for the various routing and control aspects of multimedia presentations is shared between a high-level multimedia application program, with which the user interacts to compose, edit, and view the presentation, and a multimedia operating system that performs basic, low-level operations such as data retrieval and output-device designation. This, architecture simplifies the creation of multimedia applications by relieving programmers of the need to repeatedly specify routine data-handling operations at the computer system's most basic level; the multimedia operating system acts as a bridge between high-level, user-oriented application tasks and low-level input/output (I/O) and processor commands.

Recognizing the growing importance of multimedia applications, designers of basic computer operating sysems have upgraded their systems to include specific facilities for multimedia support. These systems effectively have "built-in" multimedia architectures that programmers can invoke as appropriate. Representative of such systems is the IBM Multimedia Presentation Manager/2™ (MMPM/2™) supplied by International Business Machines Corporation (IBM) as an extension to its OS/2® operating system.

Among the tasks performed by MMPM/2 is capture and formatting of raw presentation data from real-time peripheral devices such as cameras and digitizers. Typically, a user records audio and video with a traditional transducer device such as a microphone or video camera, which converts the sound or light-intensity pattern into an analog signal. This signal may be processed into a stream of digital values by a dedicated hardware circuit, which repeatedly "samples" the magnitude of the analog signal at a rapid rate, or left as an analog recording. If the data is digitized, the multimedia operating system handles the tasks of capturing the data stream and storing it as a data file in a format that preserves the temporal or sequence characteristics of the recorded sounds and scenes. Ideally, the multimedia operating system is capable of managing analog as well as digital data.

Key to proper presentation of the various media components is synchronization. Unless the components are presented in a temporally aligned manner, the integrated multimedia output will not make sense to a viewer. Various techniques have been devised to synchronize purely digital data; see, e.g., U.S. Pat. No. 5,333,299 (Koval et al., SYNCHRONIZATION TECHNIQUES FOR MULTIMEDIA DATA STREAMS). The difficulties increase substantially, however, when some of the data is digital and some analog. Asynchronous flow can easily be detected among streams of digital data by direct comparison of streaming rates and cumulative data transfer, and synchronization mismatches corrected by bitwise data manipulations. These techniques, readily implemented at the operating system level and which operate essentially independently of data source, cannot be applied to analog data, since typically the only temporal control that can be exerted on an analog playback device relates to its play speed. Furthermore, the progress of an analog presentation cannot be monitored by digital techniques such as bit-counting. Synchronizing analog and digital information, therefore, ordinarily requires substantial application involvement and knowledge of the particular characteristics of each analog playback device.

SUMMARY OF THE INVENTION

The present invention facilitates synchronized presentation of analog and digital data by applying a common synchronization scheme to both types of data. Digital data is "streamed" by transferring the data in blocks from a source (typically a mass-storage device) to a series of memory buffers, where it accumulates for subsequent transfer to an output device driver. The control module responsible for data streaming periodically reports a temporal location within the presentation represented by the data. A supervisory module designates one of the control modules a "master", and periodically compares the values reported by the various other control modules against that reported by the master. If a comparison exceeds a threshold tolerance value associated with each control module, a sync pulse is delivered to that control module, causing it to correct the synchronization mismatch.

This architecture is applied to analog sources through the use of control modules that behave in a manner consistent with the digital control modules, but which are capable of directing the operation of analog devices and re-establishing their synchronization with other data sources despite limited modes of device control. Specifically, the control modules that handle analog information also periodically report a presentation location based solely on temporal information, react to sync pulses by altering the playback rate of the analog devices they control within user-tolerable limits, and can act as master control modules.

The invention also includes means for determining the optimal master control module, and supplies a facility for allowing multimedia applications to define groups of devices and data sources that are to be synchronized.

BRIEF DESCRIPTION OF THE DRAWINGS

The foregoing discussion will be understood more readily from the following detailed description of the invention, when taken in conjunction with the accompanying drawings, in which.

DESCRIPTION OF THE PREFERRED EMBODIMENT

The present invention is best understood in the context of MMPM/2. However, while representative of the multimedia architectures with which the present invention can be employed, MMPM/2 is by no means the only such architecture. The present invention is suited to use in conjunction with any multimedia operating system that utilizes buffering to provide an uninterrupted source of digital data to output devices during presentation, and which can control analog multimedia devices; and the ensuing discussion is intended in an exemplary, rather than limiting sense.

Figure 1:
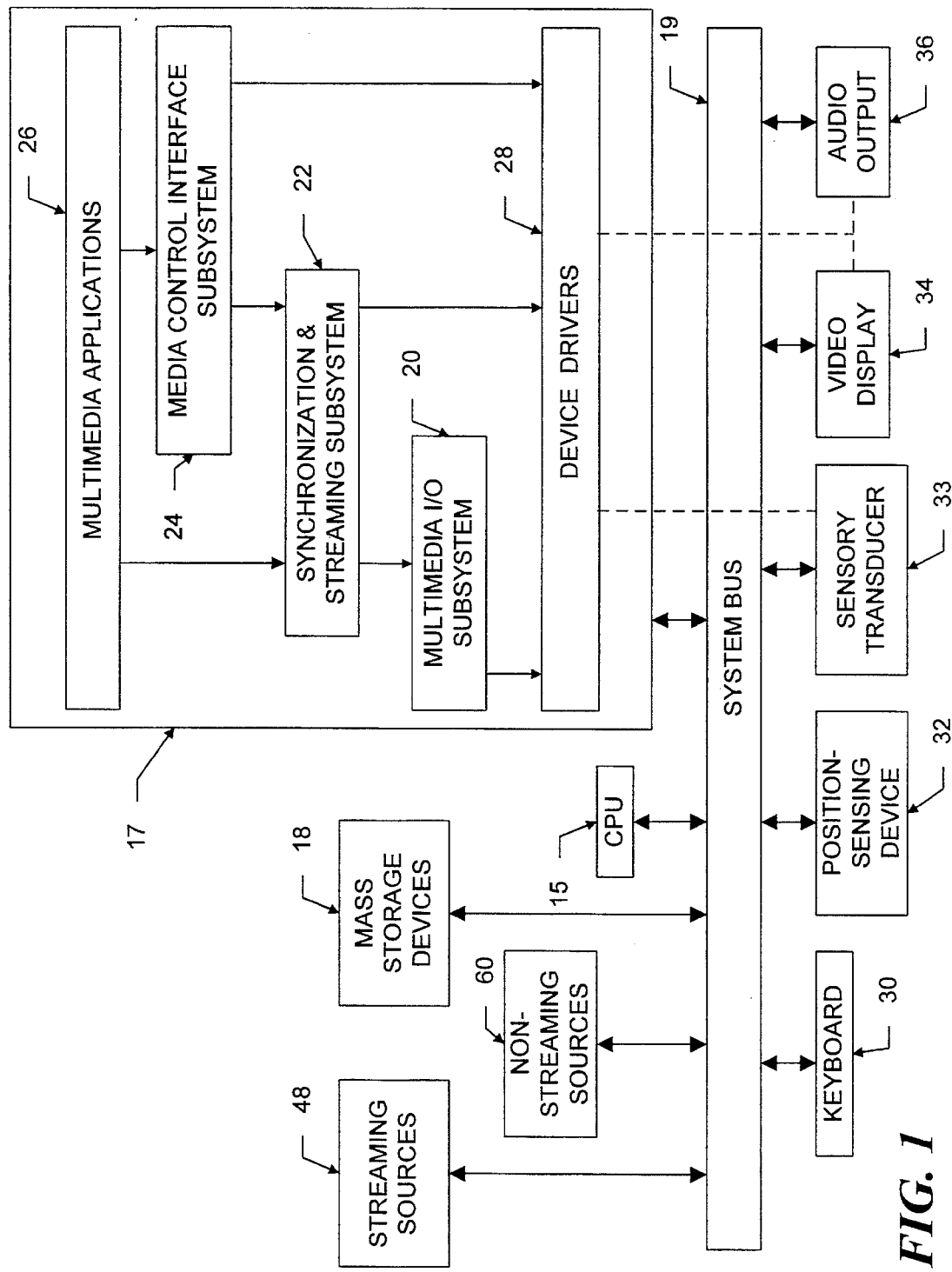
FIG. 1 schematically illustrates a representative multimedia hardware environment.

The elements of MMPM/2 and its hardware context are illustrated in FIG. 1. The computer system within which MMPM/2 operates includes a central-processing unit 15, which performs operations on and interacts with a main system memory 17 and components thereof. System memory 17 typically includes volatile or random-access memory (RAM) for temporary storage of information, including the various components of MMPM/2, buffers, and portions of the computer's basic operating system. The system typically also includes read-only memory (ROM) for permanent storage of the computer's configuration and additional portions of the basic operating system, and at least one mass storage device 18, such as a hard disk and/or CD-ROM drive. All components of the system communicate over a bidirectional system bus 19.

MMPM/2, the components of which reside in system memory 17 during operation, includes a multimedia I/O (MMIO) subsystem 20, a synchronization and streaming subsystem 22, and a media control interface (MCI) subsystem 24. These three modules execute task commands issued by one or more multimedia application programs 26 and communicate directly with a series of output device drivers 28.

Briefly, MMIO subsystem 20 contains operating routines that simplify accessing and manipulation of the very large digital files that characterize multimedia presentations. MCI 24 manages the operation of output devices, providing multimedia applications 26 with a general interface to control multimedia devices. This enables, for example, multimedia applications 26 to designate "logical," rather than specific output devices, sending commands through either a procedural interface or a string-based command interface; MCI 24 determines and activates the most appropriate output device at a given time. Subsystem 22 provides multimedia applications 26 with the ability to ensure a constant flow of synchronized data to device drivers 28. Without this latter facility, the frequent retrieval calls to mass-storage devices would cause breaks or pauses in the output presentation, and synchronization among various storage devices and data files would require substantial programming effort. Further description of MMPM/2 is contained in MULTIMEDIA PRESENTATION MANAGER/2 PROGRAMMING GUIDE (1992), published by IBM, and U.S. Pat. Nos. 5,333,299 (Koval et al., SYNCHRONIZATION TECHNIQUES FOR MULTIMEDIA DATA STREAMS) and 5,339,413 (Koval et al., DATA STREAM PROTOCOL FOR MULTIMEDIA DATA STREAMING DATA PROCESSING SYSTEM); the contents of all three of these publications are hereby incorporated by reference.

The user interacts with the system using a keyboard 30, a position-sensing device (e.g., a mouse) 32 and, in virtual-reality applications, a tactile sensory transducer (e.g., a data glove) 33. The output of these devices can be employed to designate information or select particular areas of a video screen display 34 when the user programs, configures or customizes multimedia applications 26. Ordinarily, interactions between the user and applications 26 are managed through a suitable graphical user interface appearing on display 34. During multimedia presentations, device drivers 28 operate video display 34, an audio output (e.g., an amplifier and speaker), and, if appropriate, sensory transducer 33 over bus 19. A synchronization/streaming manager 40, which represents a component of subsystem 22, retrieves multimedia information from one or more sources 48 of "streaming" data (e.g., files stored on mass storage devices 18 or in blocks of system memory) and supervises presentation of "non-streaming" data on one or more output devices 33, 34, and 36 in a manner that preserves overall device synchronization and avoids interruptions in presentation.

As used herein, "streaming" data refers to digital representations of tactile visual or audio sequences, and can take numerous forms; for example, audio data types include MIDI (musical instrument digital interface) data and ADPCM (adaptive delta pulse code modulation) compressed data. The important common feature of streaming multimedia data is a temporal flow pattern of audio, tactile, and/or visual information that is preserved in the data when stored, retrieved and provided to output devices. "Non-streaming" data means representations of visual or audio sequences that are not conveyed as streams of digital data. Non-streaming data includes, for example, analog information stored on audio or VCR tape or on a laser disc, and which is conveyed in analog form directly to an outupt device.

Figure 2:
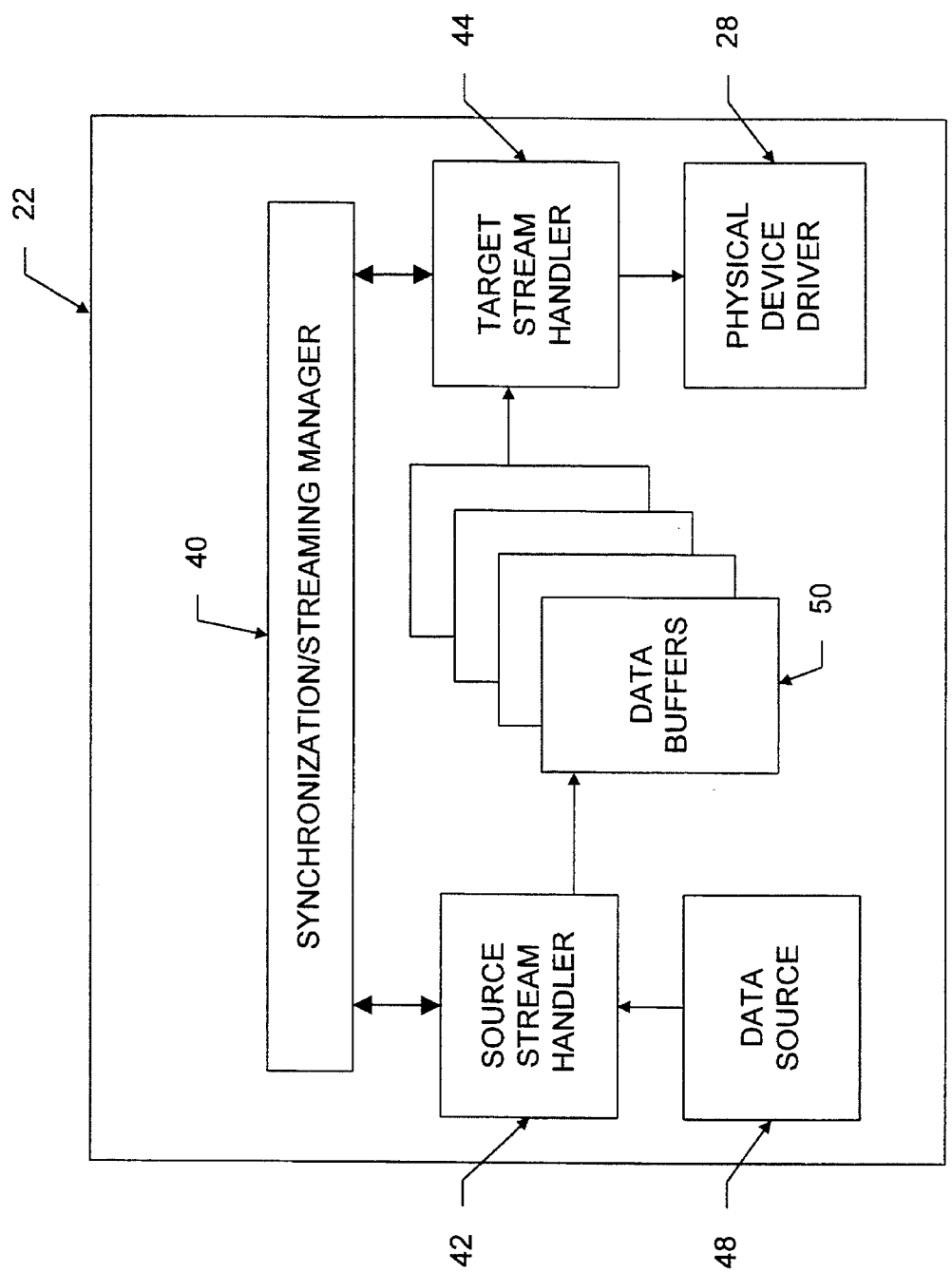
FIG. 2 schematically illustrates those components of the Synchronization/Stream Interface of MMPM/2 relevant to synchronization of streaming data.
Figure 3:
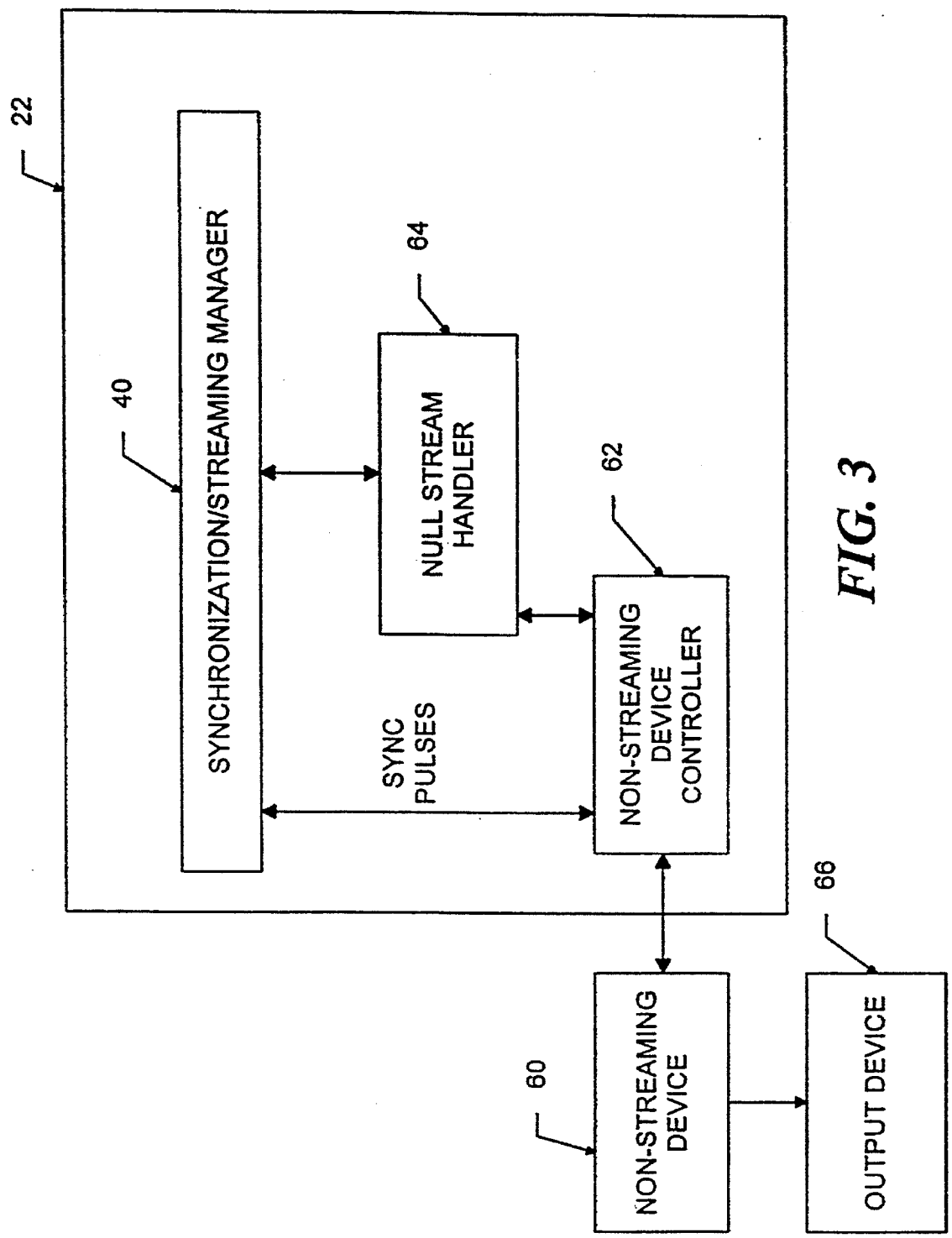
FIG. 3 schematically illustrates those components of the Synchronization/Stream Interface of MMPM/2 relevant to synchronization of non-streaming data.

The operation and internal organization of the manager 40 component of subsystem 22 are depicted in greater detail in FIGS. 2 and 3. FIG. 2 illustrates operation of manager 40 in conjunction with streaming data. Manager 40 connects a source 48 of streaming multimedia data to a destination or target device driver 28 for that data. Maintaining the temporal integrity of multimedia data and ensuring continuous presentation is an important function of manager 40. In particular, streaming data must reach the ultimate output device(s) as a continuous stream despite the fact that the data is necessarily obtained and handled in discrete blocks. A series of "stream handlers," whose operation is supervised by manager 40, performs this function in MMPM/2.

A single multimedia presentation may involve several data streams, each originating with a different storage device or file and destined for output on a different (but synchronized) output device. Manager 40 assigns a pair of stream handlers, representatively illustrated at reference numerals 42 and 44, to a particular data source and to its destination output device. The capabilities of MMPM/2 are such that more than one pair of source and destination stream handlers can operate simultaneously, their outputs being synchronized by manager 40 as described below.

Stream handler 42, designated as the source stream handler, obtains blocks of digital data from a data source 48 and loads them into a series of memory buffers 50. These are partitions of system memory 17, designated and allocated by manager 40 as described in the '299 patent. Stream handler 44, designated as the target stream handler, retrieves data from data buffers 50 and provides it to an associated device driver 28, which operates the output device for which the data is intended. This organization allows for generic handling of data, since the mode of retrieval and transfer do not depend on the particular type of data or knowledge of hardware behavior. It may prove computationally convenient to assign some of the buffers 50 to a source stream handler 42 and others to a target stream handler 44.

Stream handlers 42, 44 operate at different rates that characterize their designated functions. Stream handler 42 obtains data in discrete blocks, and its speed of operation is ultimately dictated by factors such as device access times. Stream handler 44, by contrast, may or may not pass data to device driver 28 in blocks, and its rate of data handling reflects the presentation rate of the output device. In order to ensure an uninterrupted supply of data to device driver 28 (so as to avoid presentation gaps), stream handlers 42, 44 interoperate to maintain at least some data in buffers 50 at all times during presentation.

The size and number of buffers 50 depend on the type of multimedia data retrieved by the source stream handler 42. For example, in the case of low-quality audio (e.g., 11 kHz represented at 8 bits), buffers of 4–16 kilobytes (kbytes) may suffice, while high-quality audio (e.g., 44 kHz represented at 16 bits), buffers of 32–64 kbytes may prove desirable. Buffer sizing for various types of data is discussed in the '299 and '413 patents and in MULTIMEDIA PRESENTATION MANAGER/2 PROGRAMMING GUIDE.

In a typical presentation, more than one set of stream handlers 42, 44 will be simultaneously operative; for example, one data source 48 may contain audio data and another may contain video data. In the course of its operation the multimedia application 26 designates the data sources 48 and device drivers 28 that will embody the presentation. Manager 40 assigns stream handler pairs 42, 44 thereto and controls their operation so as to ensure synchronization between all streaming data. The goal, as noted in the '299 patent, is to have all data streams start at the same time and have their perceivable outputs synchronized so the presentation makes sense to a viewer.

The invention utilizes a master/slave approach to synchronization. In one implementation, known as "master/slave independent synchronization," each data stream is driven by its own output device or clock mechanism, and each stream keeps track of its own time. Each stream handler periodically updates a dedicated data structure, stored in memory 17 and accessible to manager 40, with data indicative of its current stream time. This temporal location value may be expressed in terms of absolute time units (e.g., MMTIME units of 1/3000 sec) from the beginning of streaming, or in terms of the cumulative amount of data thus far streamed; the latter quantity is easily converted into an absolute time. Each data structure also includes a sync tolerance value for its associated stream. This value represents the degree to which the stream can be out of sync with the remaining streams without compromising the perceived integrity of the presentation.

One of the streams is designated the "master" stream, and manager 40 periodically compares the current times reported by the remaining "slave" target stream handlers against the corresponding time of the master. The target stream handler 44 of the master stream sends periodic sync pulses to manager 40, the rate of sync-pulse transmission (the sync-pulse "granularity") being determined by the nature of the master stream handler. If any of the slave stream times differ from the master time by more than the tolerance value associated with the slave, manager 40 directs a sync pulse received from the master stream handler to the out-of-sync slave stream handler or handlers. The sync pulse causes the recipient stream handler of the slave stream to register the time deviation from the master stream and take appropriate steps to correct this synchronization mismatch.

The correction process can be as simple as repeating or skipping data from buffers 50 to bring the stream into synchronization with the master. This approach is frequently useful, for example, in connection with video data, since a small number of skipped or repeated frames will not adversely affect the presentation. Alternatively, the slave stream handler can alter its data streaming rate in order to conform to that of the master. This adaptive approach is typically employed only after the slave has been found to be persistently and systematically out-of-sync, or in connection with audio data where breaks in presentation would be unacceptable.

An alternative to master/slave independent synchronization is master-driven synchronization, in which the clock of the master is used to drive all slave stream handlers. The slave streams do not have their own timing information, and depend on sync pulses—really clock pulses—from the master to maintain continuous streaming. In master-driven synchronization, all slave streams have zero sync tolerance.

The invention makes provision for supporting and synchronizing non-streaming devices through modules, called NULL stream handlers, that control synchronization of non-streaming devices but otherwise interact with manager 40 and the other stream handlers in the manner set forth above. Refer to FIG. 3, which illustrates the configuration and operation of a NULL stream handler in connection with a non-streaming device 60. A device controller 62 initiates and controls the operation of non-streaming device 60; ordinarily, controller 62 is a software module capable of transmitting electrical signals that are interpreted by device 60 as operational commands. For example, if device 60 is a laser disc player, controller 62 can direct the full repertoire of functions ordinarily associated with such players, including PLAY, STOP, PAUSE, FAST FORWARD and REWIND functions. In addition, controller 62 should be able to control the speed at which device 60 plays. The output of non-streaming device 60 is conveyed directly to an output 66 (e.g., a video display or audio amplifier).

A NULL stream handler 64 interacts with controller 62, causing it to issue synchronization-correcting control commands when manager 40 determines that device 60 is out of synchronization. Device controller 62 continuously monitors, by means of a timing circuit or algorithm, the current temporal data location within the presentation conveyed by device 60 (i.e., the amount of non-streaming data obtained thus far from the device); it periodically stores this quantity in an associated data structure (once again, in memory 17) accessible to manager 40. Controller 62 also utilizes this information as the basis for generating sync pulses to manager 40 in the event NULL stream handler 64 is designated the master. In other words, the timing arrangement of controller 62 is utilized both as a means of monitoring the progress of device 60 and as a clock for generating sync pulses.

If manager 40 determines that device 60 is out of sync by more than the tolerance value, it sends a signal to NULL stream handler 64, which is thereby enabled to receive sync pulses from manager 40. Accordingly, the NULL stream handler, like a stream handler for digital data, provides a synchronization interface to manager 40 that does not require device-specific interaction.

Manager 40 calculates the timewise amount of deviation from synchronization and infers therefrom a difference in speed between device 60 and the master stream. Based thereon, manager 40, via appropriate sync pulses, directs controller 62 to alter the playing speed of device 60 to bring it into synchronization with the master. The difference in speeds may be linearly estimated from multiple sync comparisons based on the incremental difference between comparisons; or from a single comparison assuming all devices start at the same time. The speed difference is corrected by altering the play speed of device 60 over a fixed time period specific to the device. The maximum change in speed and maximum rate of change are determined, like the tolerance parameter, by the effect of speed deviation on the viewing experience; play speed is constrained to vary within a range that will not appreciably degrade the presentation.

Manager 40 is ordinarily informed which devices and data streams are to be synchronized as a group by application program 26, based on appropriate commands issued by the program. Manager 40 then selects a master stream handler, which may be a NULL stream handler, from the array of stream handlers corresponding to the grouped devices. This selection can be forced by application program 26 or made by manager 40 based on the data-transfer rates of the various devices. Specifically, manager 40 will select, as the master stream—the term "stream" being used loosely to refer to a streaming or non-streaming data flow—the one capable of delivering synchronization pulses at the highest rate. That rate can be no greater than the rate at which the source or NULL stream handler reports its temporal location, which itself cannot exceed the overall data-transfer rate of the stream. Accordingly, manager 40 polls the stream handlers to determine which is associated with the highest data-transfer or location-reporting rate, and selects this stream as the master.

In addition, each data source can be associated with an attribute stored in a database located in system memory 22. These attributes can specify values indicating the desirability of designating the stream associated with the device as the master stream. For example, in practice an audio source is typically selected as the master, since speed-varying sync corrections to audio are most easily detected, and therefore deleterious, to the final output presentation.

It will therefore be seen that the foregoing represents an advantageous approach to synchronization of streaming and non-streaming multimedia devices. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed. For example, the various modules of the invention can be implemented on a general-purpose computer using appropriate software instructions, or as hardware circuits.

What is claimed is:

1. Apparatus for synchronizing multiple sources of multimedia data for presentation on an output device, the apparatus comprising;
   a. a group of sources of data collectively representative of an event having a temporal flow pattern, wherein the data associated with at least one of the sources is streaming data and the data associated with at least one other source is non-streaming data and, wherein the at least one non-streaming data source has a controllable play speed and the control means associated therewith comprises means for controlling the play speed so as to correct a synchronization mismatch in response to a synchronization signal;
   b. at least one output device driver;
   c. data-handling means associated with each data source, each data-handling means comprising:
      i. means for transferring data to the output device; and
      ii. control means associated with each transfer means for controlling the rate at which data is transferred and for reporting, at a characteristic frequency, a current temporal data location;
   wherein the data-handling means associated with the at least one streaming-data source comprises:
      i. at least one memory buffer;
      ii. first transfer means for loading the data from the storage device into the buffer as a first data stream that preserves the temporal flow pattern; and
      iii. second transfer means for extracting the event from the buffer as a second data stream in accordance with and at a rate representative of the temporal flow pattern and transferring the data to the output device driver, the first and second transfer means interoperating to ensure a continuous queue of data in the buffer;
   d. a synchronizer associated with all said control means for causing data to be transferred from the sources to the at least one output device driver in a temporally aligned manner, the synchronizer comprising:
      i. means for designating one of the control means as a master;
      ii. means for receiving synchronization pulses from the master control means;
      iii. means for periodically comparing the current temporal data location of each non-master control means against that of the master to derive a synchronization-mismatch value; and
      iv. means for sending a synchronization signal to selected ones of the control means based on the synchronization-mismatch values, the signals being indicative of said values, said synchronization signal causing a selected control means to correct the synchronization mismatch.

2. The apparatus of claim 1 further comprising:
   a. application interface means for accepting commands from a multimedia application program; and
   b. means coupled to the interface and responsive to the commands for enabling the application program to designate the group of sources from among a larger set of sources.

3. The apparatus of claim 1 wherein the designating means analyzes the reporting frequencies of all of the control means and designates one of the control means as a master based thereon.

4. The apparatus of claim 3 wherein the analyzing means selects, as the master control means, the control means having the highest reporting frequency.

5. The apparatus of claim 1 further comprising an attribute database associated with all of the control means, and wherein the analyzing means selects the master control means based on the attributes and the reporting frequencies of the control means.

6. The apparatus of claim 1 wherein the current temporal data location is specified by an absolute time.

7. The apparatus of claim 1 wherein the current temporal data location is specified by the cumulative amount of transferred data.

8. The apparatus of claim 1 wherein at least one of the control means corrects synchronization mismatches by skipping or repeating data.

9. The apparatus of claim 1 wherein at least one of the control means corrects synchronization mismatches by altering the rate at which data is transferred.

10. The apparatus of claim 1 wherein the at least one memory buffer comprises:
   a. at least one source memory buffer associated with the first transfer means;
   b. at least one destination memory buffer associated with the second transfer means;
   and further wherein
   c. the first transfer means comprises means for conveying data from a source to the source buffer as a data stream that preserves the temporal flow pattern; and
   d. the second transfer means comprises means for conveying data extracted from the source buffer to the output device driver for presentation at a rate corresponding to the temporal flow pattern and for storing, in the destination memory buffer, data conveyed by the first transfer means at a rate exceeding the presentation rate.

11. A computer program product for use with a computer system having at least one output device and a group of data sources collectively representative of an event having a temporal flow pattern, wherein the data associated with at least one of the sources is streaming data and the data associated with at least one other source is non-streaming data, the computer program product comprising:
   a computer usable medium having computer readable program code means embodied in said medium for causing a computer to synchronize the group of data sources of multimedia data for presentation on the at least one output device, the computer readable program code means comprising:

first program code means, associated with each data source, comprising:
     means for causing the computer system to transfer data to the output device; and
     control means associated with each computer transfer means for controlling the rate at which data is transferred by the computer and for reporting, at a characteristic frequency, a current temporal data location; and second program code means, associated with all said control means, for causing the computer system to transfer data from the data sources to the at least one output device in a temporally aligned manner, the second program code means comprising:
     means for designating one of the control means as a master;
     means for receiving synchronization pulses from the master control means;
     means for periodically comparing the current temporal data location of each non-master control means against that of the master to derive a synchronization-mismatch value;
     means for sending synchronization signals to selected ones of the control means based upon the synchronization mismatch values, the signals being indicative of said mismatch values, said synchronization signal causing the selected control means to cause the computer to correct the synchronization mismatch; and wherein the data-handling means associated with the at least one streaming-data source comprises:
       i. at least one memory buffer;
       ii. first transfer means for loading the data from the storage device into the buffer as a first data stream that preserves the temporal flow pattern; and
       iii. second transfer means for extracting the event from the buffer as a second data stream in accordance with and at a rate representative of the temporal flow pattern and transferring the data to the output device driver, the first and second transfer means interoperating to ensure a continuous queue of data in the buffer; and wherein the at least one non-streaming data source has a controllable play speed and the control means associated therewith comprises means for controlling the play speed so as to correct a synchronization mismatch in response to a synchronization signal.

* * * * *